US012689984B2

(12) United States Patent
Li

(10) Patent No.: US 12,689,984 B2
(45) Date of Patent: Jul. 21, 2026

(54) METHOD, AND ELECTRONIC DEVICE FOR POWER SAVING

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 18/003,669

(22) PCT Filed: Jul. 16, 2020

(86) PCT No.: PCT/CN2020/102508
§ 371 (c)(1),
(2) Date: Dec. 28, 2022

(87) PCT Pub. No.: WO2022/011658
PCT Pub. Date: Jan. 20, 2022

(65) Prior Publication Data
US 2023/0319718 A1 Oct. 5, 2023

(51) Int. Cl.
H04W 52/02 (2009.01)

(52) U.S. Cl.
CPC ... H04W 52/0235 (2013.01); H04W 52/0212 (2013.01)

(58) Field of Classification Search
CPC ..................... H04W 52/0235; H04W 52/0212
USPC ...................................................... 370/311
See application file for complete search history.

(56) References Cited

U.S. PATENT DOCUMENTS

| | | | |
|---|---|---|---|
| 2017/0230933 A1 | 8/2017 | Radulescu et al. | |
| 2018/0098297 A1* | 4/2018 | Yu ..................... | H04W 52/0216 |
| 2018/0263012 A1 | 9/2018 | Ryu et al. | |
| 2019/0320490 A1* | 10/2019 | Liu .................. | H04W 52/0216 |
| 2020/0178172 A1* | 6/2020 | Thangarasa .......... | H04W 76/28 |
| 2020/0229095 A1* | 7/2020 | Shrestha .............. | H04W 68/00 |
| 2020/0267670 A1* | 8/2020 | Åström ............. | H04W 52/0216 |
| 2020/0296771 A1* | 9/2020 | Tang ..................... | H04W 68/02 |
| 2021/0045181 A1* | 2/2021 | Li .......................... | H04L 5/0007 |
| 2021/0360582 A1* | 11/2021 | Priyanto ................ | H04W 4/08 |
| 2022/0078712 A1* | 3/2022 | Liu ..................... | H04W 68/005 |
| 2022/0095226 A1* | 3/2022 | Chang .............. | H04W 52/0229 |
| 2022/0124624 A1* | 4/2022 | Sha ................... | H04W 52/0229 |

(Continued)

FOREIGN PATENT DOCUMENTS

| | | |
|---|---|---|
| CN | 103581885 A | 2/2014 |
| CN | 107734639 A | 2/2018 |

(Continued)

OTHER PUBLICATIONS

"Discussion on assistant information," Proceedings of the 3GPP TSG-RAN WG2 Meeting #85, CMCC, R2-140126, Feb. 10, 2014, Prague, Czech Republic, 4 pages.

(Continued)

*Primary Examiner* — Faisal Choudhury
(74) *Attorney, Agent, or Firm* — McCoy Russell LLP

(57) ABSTRACT

A power saving method, applied to an UE, includes: determining first assistance information associated with the terminal, the first assistance information indicating a paging parameter for the terminal in a non-connected state, and being determined when the terminal is in a connected state; and sending the first assistance information.

20 Claims, 4 Drawing Sheets

(56) References Cited

U.S. PATENT DOCUMENTS

| | | | | |
|---|---|---|---|---|
| 2022/0159570 A1* | 5/2022 | Liu | ..................... | H04W 68/005 |
| 2022/0303902 A1* | 9/2022 | Tao | .................. | H04W 72/0446 |
| 2022/0353809 A1* | 11/2022 | Maleki | ................. | H04W 76/28 |
| 2023/0050355 A1* | 2/2023 | Laselva | ................ | H04W 76/27 |

FOREIGN PATENT DOCUMENTS

| | | |
|---|---|---|
| CN | 108924913 A | 11/2018 |
| CN | 109429174 A | 3/2019 |
| CN | 110574444 A | 12/2019 |
| CN | 111034227 A | 4/2020 |
| CN | 111148221 A | 5/2020 |
| CN | 111345075 A | 6/2020 |
| EP | 3021618 A1 | 5/2016 |
| EP | 3295719 B1 | 4/2021 |
| WO | 2013140033 A1 | 9/2013 |
| WO | 2016182530 A1 | 11/2016 |
| WO | 2017157348 A1 | 9/2017 |

OTHER PUBLICATIONS

"UE power consumption reduction in RRM measurements," Proceedings of the 3GPP TSG RAN WG1 Meeting #94bis, Huawei, HiSilicon, R1-1810156, Oct. 8, 2018, Chengdu, China, 4 pages.

Dai, M. et al., "Discussion on the Impact of APN Settings on NB-IoT Business Applications," Software Guide, vol. 18, No. 3, Mar. 18, 2019, 6 pages.

Li, Z. et al., "PCEP Procedures and Protocol Extensions for Using PCE as a Central Controller (PCECC) of SR-LSPs draft-zhao-pce-pcep-extension-pce-controller-sr-07," IETF Datatracker Website, Available Online at https://datatracker.ietf.org/doc/html/draft-zhao-pce-pcep-extension-pce-controller-sr-07, Jul. 13, 2020, 64 pages.

* cited by examiner

S11

Determine first assistance information

S12

Send the first assistance information

S21

Obtain first assistance information

S22

Determine a paging parameter for a terminal in a non-connected state based on the first assistance information

100

101

Determining module

102

Sending module

200

201

Obtaining module

202

Configuring module

300

301

Receiving module

METHOD, AND ELECTRONIC DEVICE FOR POWER SAVING

CROSS REFERENCE TO RELATED APPLICATION

The present application is a U.S. National Phase of International Application No. PCT/CN2020/102508 entitled "POWER SAVING METHOD, POWER SAVING SIGNAL CONFIGURATION DEVICE, AND STORAGE MEDIUM," and filed on Jul. 16, 2020. The entire contents of each of the above-listed applications are hereby incorporated by reference for all purposes.

BACKGROUND

In a communication system, a power saving signal is introduced, such as a wake up signaling (WUS). The WUS is a low-power-consumption detection signal.

In the related art, in response to determining that user equipment (UE) detects the WUS, it means that a physical downlink control channel (PDCCH) needs to be monitored. However, in response to determining that WUS is not detected, the monitoring of the PDCCH is skipped. In a scenario of configuring discontinuous reception (DRX for short), the WUS is usually configured before a DRX on-duration. In response to determining that the UE does not detect the WUS, the entire on-duration needs to be skipped. The rate of the power saving signal skipping the on-duration may be 1 or an integer greater than 1.

SUMMARY

The disclosure relates to the technical field of communications, in particular to a method, and electronic device for power saving.

In order to overcome the problem existing in the related art, the disclosure provides a power saving method, a power saving apparatus and a storage medium.

According to a first aspect of an example of the disclosure, a power saving method is provided, applied to an UE (user equipment), and including:

determining a first assistance information associated with the UE, the first assistance information indicating a paging parameter for the UE in a non-connected state, and being determined in response to determining that the UE is in a connected state; and sending the first assistance information.

According to a second aspect of an example of the disclosure, a power saving method is provided, applied to a core-network network device, and including:

obtaining a first assistance information, the first assistance information indicating a paging parameter for an UE in a non-connected state, and being determined in response to determining that the UE is in a connected state; and determining the paging parameter for the UE in the non-connected state based on the first assistance information.

According to a third aspect of an example of the disclosure, a power saving method is provided, applied to a base station, and including:

receiving a paging message carrying assistance information for an UE in a non-connected state.

According to a fourth aspect of an example of the disclosure, an electronic device is provided, including:

a processor; and a memory for storing executable instructions of the processor; where the processor is configured to execute the method according to the first aspect or any implementation in the first aspect, or configured to execute the method according to the second aspect or any implementation in the second aspect, or configured to execute the method according to the third aspect or any implementation in the third aspect.

It should be understood that the above general description and the following detailed description are merely for example and explanatory, and cannot limit the disclosure.

BRIEF DESCRIPTION OF THE DRAWINGS

Accompanying drawings here, which are incorporated in and constitute a part of this specification, illustrate examples consistent with the disclosure and together with the specification serve to explain the principles of the disclosure.

DETAILED DESCRIPTION

Figure 1:
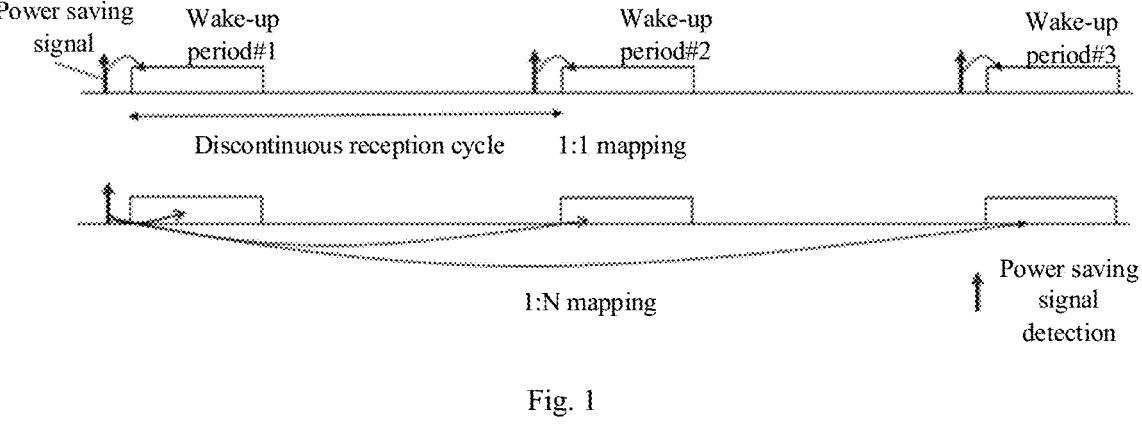
FIG. 1 is a schematic diagram of a power saving method based on a power saving signal monitoring channel shown according to an example.

Examples will be illustrated in detail here, and instances of which are represented in accompanying drawings. In response to determining that the following description refers to the accompanying drawings, the same number in different accompanying drawings represents the same or similar elements unless otherwise indicated. The implementations described in the following examples do not represent all implementations consistent with the disclosure. On the contrary, they are merely examples of an apparatus and method consistent with some aspects of the disclosure as detailed in the appended claims.

In a communication system, a power saving signal is introduced, such as a wake up signaling (WUS). The WUS is a low-power-consumption detection signal.

In the related art, in response to determining that user equipment (UE) detects the WUS, it means that a physical downlink control channel (PDCCH) needs to be monitored. However, in response to determining that WUS is not detected, the monitoring of the PDCCH is skipped. In a scenario of configuring discontinuous reception (DRX for short), the WUS is usually configured before a DRX on-duration. In response to determining that the UE does not detect the WUS, the entire on-duration needs to be skipped. The rate of the power saving signal skipping the on-duration may be 1 or an integer greater than 1.

However, in the related art, the WUS is configured for a connected state, and there is no solution of the WUS configured before the DRX on-duration for an UE (user equipment) in an idle state/inactive state to solve power saving for the UE in the idle state/inactive state.

DRX refers to that an UE stops monitoring a channel for a period of time, or monitors the channel regularly according to a preset time, so as to achieve a purpose of power saving. In a first generation communication system, for example, a power saving signal is introduced in a power saving item of the first generation communication system R16, for example, the power saving signal is a WUS. In a scenario of configuring the DRX, the WUS is usually configured before a DRX on-duration. In response to determining that UE detects the WUS, it means that channel monitoring needs to be performed in a subsequent DRX on-duration. For example, in response to determining that the monitored channel is a PDCCH, monitoring is performed when the WUS signal is detected. In response to determining that the UE does not detect the WUS, the subsequent DRX on-duration needs to be skipped. In other words, in response to determining that the UE does not detect the WUS, channel monitoring is not needed during the subsequent DRX on-duration. The number of the DRX on-durations needing to be skipped in response to determining that one WUS signal is detected is determined by a specified rate configured by a base station for the UE. It is further understood that in response to determining that the specified rate configured by the base station for the UE is 1, a mapping relationship between the power saving signal and the number of the on-durations is 1:1. That is, in response to determining that the UE detects one power saving signal, it needs to monitor the PDCCH for the subsequent one DRX on-duration. In a similar fashion, in response to determining that the specified rate configured by the base station for the UE is N, the mapping relationship between the power saving signal and the number of the on-durations is 1:N. That is, in response to determining that the UE detects one power saving signal, it needs to monitor the PDCCH for the subsequent N DRX on-durations. N is a positive integer.

Further, FIG. 1 is a schematic diagram of a power saving signal configuration method based on a power saving signal monitoring channel shown according to an example. As shown in FIG. 1, arrows in FIG. 1 are used for representing detection of a power saving signal. In response to determining that a mapping relationship between the power saving signal and the number of on-durations is 1:1, the power saving signal needs to be detected before each on-duration. That is, after the power saving signal before a first DRX on-duration is detected, channel monitoring in the first DRX on-duration starts. The power saving signal still needs to be detected before a second DRX on-duration. As shown in FIG. 1, one DRX cycle is from a start time of the first DRX on-duration to a start time of the next DRX on-duration. It should be understood that one DRX cycle includes the on-duration and a dormancy period. The dormancy period of one DRX cycle is from an end time of the first DRX on-duration to the start time of the next DRX on-duration. In another implementation, in response to determining that the mapping relationship between the power saving signal and the number of the on-durations is 1:N, when the power saving signal is detected, channel monitoring is performed for the subsequent N consecutive DRX on-durations, and the power saving signal is re-detected before the N+1 DRX on-duration. It should be noted that channel monitoring for the N consecutive DRX on-durations is performed during the DRX in an activated state. In one implementation, in response to determining that the power saving signal is not detected before the DRX duration when the power saving signal needs to be detected, one DRX duration is skipped whether the mapping relationship between the power saving signal and the number of the on-durations is 1:1 or the mapping relationship between the power saving signal and the number of the on-durations is 1:N.

In a power saving item of a communication system R16, the UE needs to report assistance information to a network device. The assistance information reported to the network device is used for configuring the power saving signal by the network device. Further, the power saving signal includes: whether the UE supports the power saving signal and the start and end time of the power saving signal. It should be understood that the start and end time configuration of the power saving signal may be relative to an offset of a certain reference point. For example, for an offset relative to a starting point of the on-duration, the start and end time of the power saving signal is configured as the offset relative to the starting point of the on-duration, which is closely related to implementation of the UE.

Table 1 shows a protocol provision for an offset condition supported by the UE. As shown in Table 1, a unit of sub-carrier space (SCS) is KHz, and two types of gap indications are given. In the table, Minimum Time Gap TminimumTimeGap (slots) indicates an insertion time of a minimum time gap, Value 1 is a first gap indication, and Value 2 is a second gap indication.

| SCS | Minimum Time Gap $T_{minimumTimeGap}$(slots) | |
| --- | --- | --- |
| (kHz) | Value 1 | Value 2 |
| 15 | 1 | 3 |
| 30 | 1 | 6 |
| 60 | 1 | 12 |
| 120 | 2 | 24 |

Figure 2:
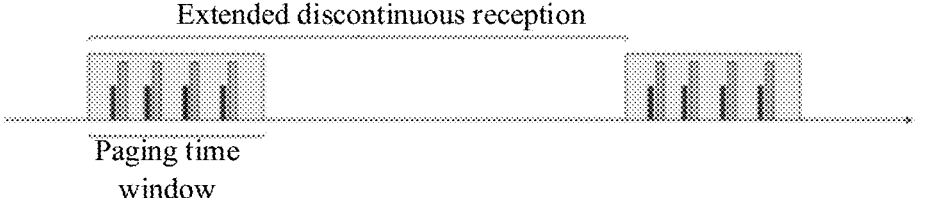
FIG. 2 is a schematic diagram of a paging time window (PTW) of a power saving method shown according to an example.

In a power saving item of the new generation communication system, there is no solution of the WUS configured before the DRX on-duration for an UE in a non-connected state to solve power saving for the UE in the non-connected state. The non-connected state is the idle state or the inactive state. Hence, based on the implementation method of the power saving signal involved in the above example, in response to determining that the UE is in the non-connected state, the power saving signal may also be set before the paging occasion. FIG. 2 is a schematic diagram of a paging time window (PTW) of a power saving signal configuration method shown according to an example. As shown in FIG. 2, for a use scenario of eDRX, the power saving signal may be configured before the paging time window (PTW) to assisting in monitoring a paging message. Hence, the disclosure provides a power saving method, which may take assistance information of the power saving signal used in response to determining that the UE is in a connected state as the assistance information of the power saving signal in response to determining that the UE is in the non-connected state. An original signaling process is further expanded, and a behavior of the UE in the connected state or non-connected state is standardized, so as to achieve a purpose of power saving of the UE in the non-connected state.

The terminal may also be called used equipment (UE), a mobile station (MS), a mobile terminal (MT) and the like, and is a device for providing voice and/or data connectivity for a user. For example, the UE may be a handheld device, a vehicle-mounted device and other devices with a wireless connecting function. At present, some examples of the UE are: a smart mobile phone, a pocket personal computer (PPC), a palm computer, a personal digital assistant (PDA), a notebook computer, a tablet computer, a wearable device, or the vehicle-mounted device, etc.

Figures 3, 4:
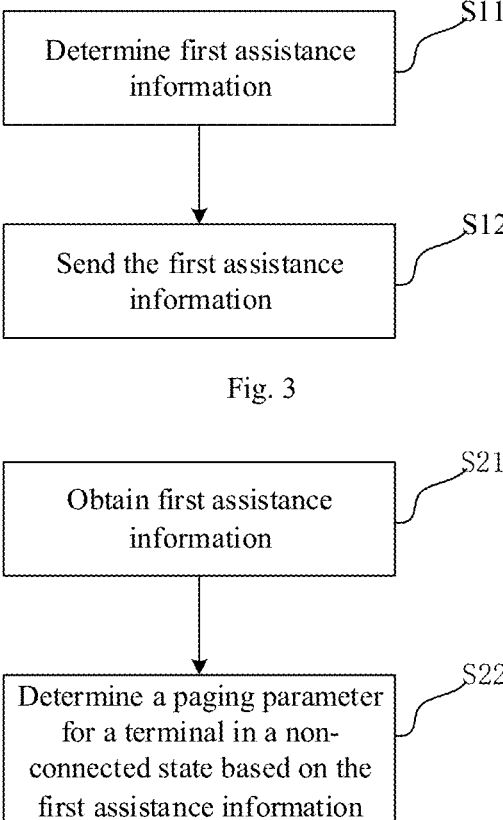
FIG. 3 is a flow diagram of a power saving method shown according to an example.
FIG. 4 is a flow diagram of a power saving method shown according to an example.

FIG. 3 is a flow diagram of a power saving method shown according to an example. As shown in FIG. 3, the power saving method performed by an UE, and includes the following steps.

In step S11, first assistance information is determined.

In some examples of the disclosure, the first assistance information may be assistance information of a power saving signal in response to determining that the UE is in a connected state. In some other examples of the disclosure, the first assistance information may be assistance information used in a non-connected state generated according to the assistance information of the power saving signal in response to determining that the UE is in the connected state. In some other examples of the disclosure, the first assistance information may be the assistance information used in the non-connected state generated according to the assistance information of the power saving signal in response to determining that the UE is in the connected state, where the UE may generate the assistance information used in the non-connected state at any possible time point. In all the examples of the disclosure, the non-connected state may be an idle state, or an inactive state, or any state different from the connected state.

In all the examples of the disclosure, illustration is made by taking an example that the first assistance information is the assistance information of the power saving signal in response to determining that the UE is in the connected state.

In some examples of the disclosure, the first assistance information is a paging parameter used in response to determining that the UE is in the non-connected state.

In step S12, the first assistance information is sent.

In the example of the disclosure, after the UE determines the first assistance information, the UE may send the determined first assistance information to a core network (CN) network device, so that the core-network network device determines the assistance information of the power saving signal that initiates paging in response to determining that the UE is in the non-connected state according to the received first assistance information.

In the example of the disclosure, the first assistance information may include at least one of the following parameters:

information for indicating whether a sender supports the power saving signal;

information for indicating whether the sender activates the power saving signal; or information for indicating a mapping relationship between the power saving signal and the number of on-durations.

In some examples of the disclosure, the first assistance information includes a first identifier and/or a second identifier.

In some examples of the disclosure, the first assistance information includes the first identifier, and the first identifier is used to identify the assistance information corresponding to the UE in the connected state and/or the non-connected state. In some examples of the disclosure, the first identifier may be a first field domain, and the first field domain includes one bit. The one bit is used to identify whether the UE supports configuration related to the power saving signal in response to determining that the UE is in the connected state and/or non-connected state.

In some examples of the disclosure, the first assistance information includes the second identifier, and the second identifier is used to identify the assistance information corresponding to the UE in the connected state and/or the non-connected state. In some examples of the disclosure, the second identifier may be a second field domain, and the second field domain includes the plurality of bits. The at least one bit is used to indicate whether the UE supports assistance information in the connected state, and the at least one bit is used to indicate whether the UE supports assistance information in the non-connected state. In some examples, the non-connected state may include the idle state and the inactive state, and the second field domain include at least one bit for indicating whether the UE supports assistance information in the idle state, and at least one bit for indicating whether the UE supports assistance information in the inactive state. With subsequent evolution of the technology, the non-connected state may further include other states, and thus the second field domain includes at least one bit for indicating whether the UE supports assistance information in other states.

It needs to be understood that for the convenience of description, an identifier of the bit used to represent the corresponding assistance information in response to determining that the UE is in the connected state or the bit used to represent the corresponding assistance information in response to determining that the UE is in unconnected state is called the second identifier.

In other words, for the identifier of expressing the assistance information involved in the above example, one bit corresponding to the first field domain may be adopted to uniformly identify the assistance information corresponding to the UE in the connected state and/or non-connected state, and different bits may further be used to represent the assistance information corresponding to the UE in different states (such as the connected state, the idle state, the inactive state and any other possible states). The assistance information is at least one of the following parameters: information for indicating whether the UE supports the power saving signal, information for indicating whether the power saving signal is activated, or a mapping relationship between the power saving signal and the number of on-durations.

In some examples of the disclosure, the first assistance information may include first indication information for indicating whether a repeated transmission parameter is activated. In all the examples of the disclosure, the information for indicating whether repeated transmission is activated is a third field domain. The repetition number is a repetition number of a transmitted control channel or service channel before a connection between a core network and UE is released. The UE informs the core-network network device through the first assistance information of the repetition number of the transmitted control channel or service channel before the connection between the core network and the UE is released, and whether the UE uses a coverage enhancement technology is further informed. In some examples of the disclosure, the UE may use an explicit indication, that is, one bit for indicating, or use an implicit indication (such as an encoding mode, a signaling length and a signaling type) mode to inform the core network of the repetition number of the transmitted control channel or service channel before the connection with the core network is released.

In some examples of the disclosure, the first assistance information further includes a start time gap for power saving signal with long discontinuous reception cycle, namely a gap parameter of a Long DRX; and/or a time gap of a discontinuous reception short cycle power saving signal, namely a gap parameter of a Short DRX. In some examples, a type of the time gap of the discontinuous reception long cycle power saving signal (namely the gap parameter of the Long DRX) may be indicated through one field domain. For example, the gap parameter has two types: type 1 and type 2; the field domain may include one bit, and in response to being a first value, the bit is used to indicate the type of the gap parameter is type 1; and in response to being a second value, the bit is used to indicate the type of the gap parameter is type 2. Certainly, in response to determining that there are the plurality of types, the field domain may include the plurality of bits, where each bit corresponds to at least one type or the plurality of different values of the plurality of bits correspond to the plurality of different types. In some examples of the disclosure, the time gap of the discontinuous reception long cycle power saving signal (namely the gap parameter of the Long DRX) refers to a gap parameter of a Long DRX corresponding to each sub-carrier space. In some examples of the disclosure, the time gap of the discontinuous reception short cycle power saving signal (namely the gap parameter of the Short DRX) refers to a gap parameter of a Short DRX corresponding to each sub-carrier space.

In some examples of the disclosure, the first assistance information includes at least one of the following identifiers:

a third identifier for indicating whether the UE supports the power saving signal;

a fourth identifier for indicating whether the power saving signal is activated; or a fifth identifier for indicating the mapping relationship between the power saving signal and the number of the on-durations.

In the above example of the disclosure, the third identifier, the fourth identifier and the fifth identifier may each include the one or more bits.

In the example of the disclosure, the first identifier, the second identifier, the third identifier, the fourth identifier and the fifth identifier above may be used separately or in combination at will. For example, in response to determining that the second identifier is used in combination with the third identifier, the fourth identifier and the fifth identifier, it may indicate whether the UE supports the power saving signal, whether the power saving signal is activated, and the mapping relationship between the power saving signal and the number of the on-durations in the connected state, as well as whether the UE supports the power saving signal, whether the power saving signal is activated, and the mapping relationship between the power saving signal and the number of the on-durations in the idle state, as well as whether the UE supports the power saving signal, whether the power saving signal is activated, and the mapping relationship between the power saving signal and the number of the on-durations in the inactive state. For another example, in response to determining that the first identifier is used in combination with the third identifier, the fourth identifier and the fifth identifier, it may indicate whether the UE supports the power saving signal, whether the power saving signal is activated, and the mapping relationship between the power saving signal and the number of the on-durations in the connected state/idle state/inactive state. For another example, in response to determining that the first identifier is used in combination with the third identifier, it may indicate whether the UE supports the power saving signal in the connected state/idle state/inactive state.

In one specific example, each piece of information included in the first assistance information may be represented by 1 bit or 2 bit. In one example, the information included in the first assistance information to identify whether a sender supports the power saving signal is 1 bit. In response to determining that the bit value is 1, it indicates that the sender supports the power saving signal whether in the connected or non-connected state. In response to determining that the bit value is 0, it indicates that the sender does not support the power saving signal whether in the connected or non-connected state. In another example, the information included in the first assistance information to identify whether the sender supports the power saving signal is 2 bit, where the first bit indicates whether the sender supports the power saving signal in the connected state, and the second bit indicates whether the sender supports the power saving signal in the non-connected state. For example, in response to determining that the 2-bit value is 10, it indicates that the sender supports the power saving signal in the connected state, but does not support the power saving signal in the non-connected state. In response to determining that the 2-bit value is 11, it indicates that the sender supports the power saving signal whether in the connected state or in the non-connected state; and so on. The above examples are also applicable to other information included in the first assistance information, such as information for indicating whether the sender activates the power saving signal and/or information for indicating the mapping relationship between the power saving signal and the number of the on-durations.

In the example of the disclosure, the UE may send the first assistance information to the core-network network device through a radio access network (RAN) network device. In some examples of the disclosure, a base station may send the first assistance information by sending an UE release (RRC Release) message to the core network. In some examples of the disclosure, the base station may send the first assistance information by sending a UE capacity info notification message to the core network. In some examples of the disclosure, the base station may obtain a paging parameter of the power saving signal for paging in response to determining that the UE is in the non-connected state through a paging message.

In the example of the disclosure, the power saving signal is used for the UE to skip a paging occasion (PO) in the non-connected state. For example, in a scenario just as an example, the power saving signal can be applied to UE that uses coverage enhancement, such as UE located at a cell edge. In order to achieve coverage enhancement for the UE located at the cell edge, repeat transmission needs to be used, that is, the same signal is transmitted N times to achieve coverage enhancement. If the PO corresponds to repeated transmission, the UE may skip the PO corresponding to N repeated transmissions through one wake-up signaling (WUS), without decoding signaling sent by these Pos. However, for those UEs located at a non-cell edge, the repetition number may be very small (that is, N is very small) or even no, and one wake-up signaling (WUS) may merely omit decoding of one or several PO transmissions, so the gain is not large. Hence, in the example of the disclosure, the UE may report its corresponding WUS to the network side, so that the UE may report a situation before connection release to the core network for use in the next paging. That is, not all the UEs use the same WUS parameter. That is, granularity of the WUS parameter may be UE or UE groups (that is, the UEs are grouped, and each UE group has the same WUS parameter), which can improve efficiency of the entire system.

In the example of the disclosure, in response to determining that the first assistance information includes the start time gap for power saving with long discontinuous reception cycle power saving signal or the start time gap for power saving signal with short discontinuous reception cycle, that is, for an UE that reports one gap indication capability, the start time gap for power saving with long discontinuous reception cycle power saving signal or the start time gap for power saving with short discontinuous reception cycle power saving signal of the UE in the connected state is taken as the long cycle power saving signal start time gap of the UE in the connected state, and the power saving signal start time gap in the non-connected state.

In another implementation, in response to determining that the first assistance information includes the start time gap for power saving with long discontinuous reception cycle power saving signal and the start time gap for power saving signal with short discontinuous reception cycle, that is, for an UE that reports two gap indication capabilities, a first paging occasion of a paging time window of extended discontinuous reception in the non-connected state is configured based on the start time gap for power saving with long discontinuous reception cycle power saving signal in the connected state, and a non-first paging occasion of the paging time window of extended discontinuous reception is configured based on the start time gap for power saving signal with short discontinuous reception cycle.

In another implementation, for an UE that reports the one or two gap indication capabilities, a paging occasion within and outside the paging time window of extended discontinuous reception in the non-connected state is configured based on the start time gap for power saving with long discontinuous reception cycle power saving signal in the connected state.

It should be understood that the on-duration is the DRX on-duration, and the assistance information of the power saving signal in the connected state is configured before the on-duration. The gap is an offset value of a start and end time configuration of the power saving signal relative to a reference point. For example, the gap may be an offset value relative to the on-duration.

In the example of the disclosure, the core-network network device may obtain the first assistance information through the UE release message sent by the radio-access-network network device to the core-network network device. Or, the core-network network device may obtain the first assistance information through the UE capability information notification message sent by the radio-access-network network device to the core-network network device.

In the example of the disclosure, in response to determining that the core-network network device sends the paging message to the radio-access-network network device, the core-network network device may send the paging parameter for configuring the power saving signal for paging in response to determining that the UE is in the non-connected state.

The technical solution provided by the examples of the disclosure may include the following beneficial effects: by indicating the paging parameter for the UE in the non-connected state through the first assistance information determined in response to determining that the UE is in the connected state, the core-network network device determines the assistance information of the power saving signal that initiates paging in response to determining that the UE is in the non-connected state according to the first assistance information, thus realizing the configuration of the power saving signal for the UE in the non-connected state.

FIG. 4 is a flow diagram of a power saving method shown according to an example. As shown in FIG. 4, for example, the power saving method may performed by a core-network network device or any proper device in a network. The method includes the following steps.

In step S21, first assistance information is obtained, where the first assistance information indicates a paging parameter for an UE in a non-connected state, and is determined in response to determining that the UE is in a connected state; and in step S22, the paging parameter for the UE in the non-connected state is determined based on the first assistance information.

In some examples of the disclosure, the first assistance information may be assistance information of a power saving signal in response to determining that the UE is in the connected state. In some other examples of the disclosure, the first assistance information may be assistance information used in a non-connected state generated according to the assistance information of the power saving signal in response to determining that the UE is in the connected state. In some other examples of the disclosure, the first assistance information may be the assistance information used in the non-connected state generated according to the assistance information of the power saving signal in response to determining that the UE is in the connected state, where the UE may generate the assistance information used in the non-connected state at any possible time point. In all the examples of the disclosure, the non-connected state may be an idle state, or an inactive state, or any state different from the connected state.

In all the examples of the disclosure, illustration is made by taking an example that the first assistance information is the assistance information of the power saving signal in response to determining that the UE is in the connected state.

In some examples of the disclosure, the first assistance information is the paging parameter used in response to determining that the UE is in the non-connected state.

In step S12, the first assistance information is sent.

In the example of the disclosure, after the UE determines the first assistance information, the UE may send the determined first assistance information to a core network (CN) network device, so that the core-network network device determines the assistance information of the power saving signal that initiates paging in response to determining that the UE is in the non-connected state according to the received first assistance information.

In the example of the disclosure, the first assistance information may include at least one of the following parameters:

information for indicating whether a sender supports the power saving signal;

information for indicating whether the sender activates the power saving signal; or information for indicating a mapping relationship between the power saving signal and the number of on-durations.

In some examples of the disclosure, the first assistance information includes a first identifier and/or a second identifier.

In some examples of the disclosure, the first assistance information includes the first identifier, and the first identifier is used to identify the assistance information corresponding to the UE in the connected state and/or the non-connected state. In some examples of the disclosure, the first identifier may be a first field domain, and the first field domain includes one bit. The one bit is used to identify whether the UE supports configuration related to the power saving signal in response to determining that the UE is in the connected state and/or non-connected state.

In some examples of the disclosure, the first assistance information includes the second identifier, and the second identifier is used to identify the assistance information corresponding to the UE in the connected state and/or the non-connected state. In some examples of the disclosure, the second identifier may be a second field domain, and the second field domain includes the plurality of bits. The at least one bit is used to indicate whether the UE supports assistance information in the connected state, and the at least one bit is used to indicate whether the UE supports the assistance information in the non-connected state. In some examples, the non-connected state may include the idle state and the inactive state, and the second field domain include at least one bit for indicating whether the UE supports assistance information in the idle state, and at least one bit for indicating whether the UE supports assistance information in the inactive state. With subsequent evolution of the technology, the non-connected state may further include other states, and thus the second field domain includes at least one bit for indicating whether the UE supports assistance information in other states.

It needs to be understood that for the convenience of description, an identifier of the bit used to represent the corresponding assistance information in response to determining that the UE is in the connected state or the bit used to represent the corresponding assistance information in response to determining that the UE is in unconnected state is called the second identifier.

In other words, for the identifier of expressing the assistance information involved in the above example, one bit corresponding to the first field domain may be adopted to uniformly identify the assistance information corresponding to the UE in the connected state and/or non-connected state, and different bits may further be used to represent the assistance information corresponding to the UE in different states (such as the connected state, the idle state, the inactive state and any other possible states). The assistance information is at least one of the following parameters: information for indicating whether the UE supports the power saving signal, information for indicating whether the power saving signal is activated, or a mapping relationship between the power saving signal and the number of on-durations.

In some examples of the disclosure, the first assistance information may include first indication information for indicating whether a repeated transmission parameter is activated. In all the examples of the disclosure, the information for indicating whether repeated transmission is activated is a third field domain. The repetition number is a repetition number of a transmitted control channel or service channel before a connection between a core network and UE is released. The UE informs the core-network network device through the first assistance information of the repetition number of the transmitted control channel or service channel before the connection between the core network and the UE is released, and whether the UE uses a coverage enhancement technology is further informed. In some examples of the disclosure, the UE may use an explicit indication, that is, one bit for indicating, or use an implicit indication (such as an encoding mode, a signaling length and a signaling type) mode to inform the core network of the repetition number of the transmitted control channel or service channel before the connection with the core network is released.

In some examples of the disclosure, the first assistance information further includes a start time gap for power saving signal with long discontinuous reception cycle, namely a gap parameter of a Long DRX; and/or a time gap of a discontinuous reception short cycle power saving signal, namely a gap parameter of a Short DRX. In some examples, a type of the time gap of the discontinuous reception long cycle power saving signal (namely the gap parameter of the Long DRX) may be indicated through one field domain. For example, the gap parameter has two types: type 1 and type 2; the field domain may include one bit, and in response to being a first value, the bit is used to indicate the type of the gap parameter is type 1; and in response to being a second value, the bit is used to indicate the type of the gap parameter is type 2. Certainly, in response to determining that there are the plurality of types, the field domain may include the plurality of bits, where each bit corresponds to at least one type or the plurality of different values of the plurality of bits correspond to the plurality of different types. In some examples of the disclosure, the time gap of the discontinuous reception long cycle power saving signal (namely the gap parameter of the Long DRX) refers to a gap parameter of a Long DRX corresponding to each sub-carrier space. In some examples of the disclosure, the time gap of the discontinuous reception short cycle power saving signal (namely the gap parameter of the Short DRX) refers to a gap parameter of a Short DRX corresponding to each sub-carrier space.

In some examples of the disclosure, the first assistance information includes at least one of the following identifiers:

a third identifier for indicating whether the UE supports the power saving signal;

a fourth identifier for indicating whether the power saving signal is activated; or a fifth identifier for indicating the mapping relationship between the power saving signal and the number of the on-durations.

In the above example of the disclosure, the third identifier, the fourth identifier and the fifth identifier may each include the one or more bits.

In the example of the disclosure, the first identifier, the second identifier, the third identifier, the fourth identifier and the fifth identifier above may be used separately or in combination at will. For example, in response to determining that the second identifier is used in combination with the third identifier, the fourth identifier and the fifth identifier, it may indicate whether the UE supports the power saving signal, whether the power saving signal is activated, and the mapping relationship between the power saving signal and the number of the on-durations in the connected state, as well as whether the UE supports the power saving signal, whether the power saving signal is activated, and the mapping relationship between the power saving signal and the number of the on-durations in the idle state, as well as whether the UE supports the power saving signal, whether the power saving signal is activated, and the mapping relationship between the power saving signal and the number of the on-durations in the inactive state. For another example, in response to determining that the first identifier is used in combination with the third identifier, the fourth identifier and the fifth identifier, it may indicate whether the UE supports the power saving signal, whether the power saving signal is activated, and the mapping relationship between the power saving signal and the number of the on-durations in the connected state/idle state/inactive state. For another example, in response to determining that the first identifier is used in combination with the third identifier, it may indicate whether the UE supports the power saving signal in the connected state/idle state/inactive state.

In one specific example, each piece of information included in the first assistance information may be represented by 1 bit or 2 bit. In one example, the information included in the first assistance information to identify whether a sender supports the power saving signal is 1 bit. In response to determining that the bit value is 1, it indicates that the sender supports the power saving signal whether in the connected or non-connected state. In response to determining that the bit value is 0, it indicates that the sender does not support the power saving signal whether in the connected or non-connected state. In another example, the information included in the first assistance information to identify whether the sender supports the power saving signal is 2 bit, where the first bit indicates whether the sender supports the power saving signal in the connected state, and the second bit indicates whether the sender supports the power saving signal in the non-connected state. For example, in response to determining that the 2-bit value is 10, it indicates that the sender supports the power saving signal in the connected state, but does not support the power saving signal in the non-connected state. In response to determining that the 2-bit value is 11, it indicates that the sender supports the power saving signal whether in the connected state or in the non-connected state; and so on. The above examples are also applicable to other information included in the first assistance information, such as information for indicating whether the sender activates the power saving signal and/or information for indicating the mapping relationship between the power saving signal and the number of the on-durations.

In the example of the disclosure, the UE may send the first assistance information to the core-network network device through a radio access network (RAN) network device. In some examples of the disclosure, a base station may send the first assistance information by sending an UE release (RRC Release) message to the core network. In some examples of the disclosure, the base station may send the first assistance information by sending a UE capacity info notification message to the core network. In some examples of the disclosure, the base station may obtain a paging parameter of the power saving signal for paging in response to determining that the UE is in the non-connected state through a paging message.

In the example of the disclosure, the power saving signal is used for the UE to skip a paging occasion (PO) in the non-connected state. For example, in a scenario just as an example, the power saving signal can be applied to UE that uses coverage enhancement, such as UE located at a cell edge. In order to achieve coverage enhancement for the UE located at the cell edge, repeat transmission needs to be used, that is, the same signal is transmitted N times to achieve coverage enhancement. If the PO corresponds to repeated transmission, the UE may skip the PO corresponding to N repeated transmissions through one wake-up signaling (WUS), without decoding signaling sent by these Pos. However, for those UEs located at a non-cell edge, the repetition number may be very small (that is, N is very small) or even no, and one wake-up signaling (WUS) may merely omit decoding of one or several PO transmissions, so the gain is not large. Hence, in the example of the disclosure, the UE may report its corresponding WUS to the network side, so that the UE may report a situation before connection release to the core network for use in the next paging. That is, not all the UEs use the same WUS parameter. That is, granularity of the WUS parameter may be UE or UE groups (that is, the UEs are grouped, and each UE group has the same WUS parameter), which can improve efficiency of the entire system.

In the example of the disclosure, in response to determining that the first assistance information includes the start time gap for power saving with long discontinuous reception cycle power saving signal or the start time gap for power saving signal with short discontinuous reception cycle, that is, for an UE that reports one gap indication capability, the start time gap for power saving with long discontinuous reception cycle power saving signal or the start time gap for power saving with short discontinuous reception cycle power saving signal of the UE in the connected state is taken as the long cycle power saving signal start time gap of the UE in the connected state, and the power saving signal start time gap in the non-connected state.

In another implementation, in response to determining that the first assistance information includes the start time gap for power saving with long discontinuous reception cycle power saving signal and the start time gap for power saving signal with short discontinuous reception cycle, that is, for an UE that reports two gap indication capabilities, a first paging occasion of a paging time window of extended discontinuous reception in the non-connected state is configured based on the start time gap for power saving with long discontinuous reception cycle power saving signal in the connected state, and a non-first paging occasion of the paging time window of extended discontinuous reception is configured based on the start time gap for power saving signal with short discontinuous reception cycle.

In another implementation, for an UE that reports the one or two gap indication capabilities, a paging occasion within and outside the paging time window of extended discontinuous reception in the non-connected state is configured based on the start time gap for power saving with long discontinuous reception cycle power saving signal in the connected state.

In the example of the disclosure, the core-network network device may obtain the first assistance information through the UE release message sent by the radio-access-network network device to the core-network network device. Or, the core-network network device may obtain the first assistance information through the UE capability information notification message sent by the radio-access-network network device to the core-network network device.

In the example of the disclosure, in response to determining that the core-network network device sends the paging message to the radio-access-network network device, the core-network network device may send the paging parameter for configuring the power saving signal for paging in response to determining that the UE is in the non-connected state.

Based on the same concept, an example of the disclosure further provides a power saving apparatus.

It may be understood that, in order to implement the above functions, the power saving apparatus provided by the example of the disclosure contains corresponding hardware structures and/or software modules for executing all the functions. Combining with units and algorithm steps of each example disclosed in the example of the disclosure, the example of the disclosure can be implemented in a form of hardware or a combination of hardware and computer software. Whether a certain function is executed in a mode of hardware or a mode of the hardware driven by the computer software depends on a specific application and design constraint conditions of the technical solution. Those skilled in the art may use different methods to implement the described functions for each specific application, but such implementation should not be regarded beyond the scope of the technical solution of the example of the disclosure.

Figures 5, 6, 7:
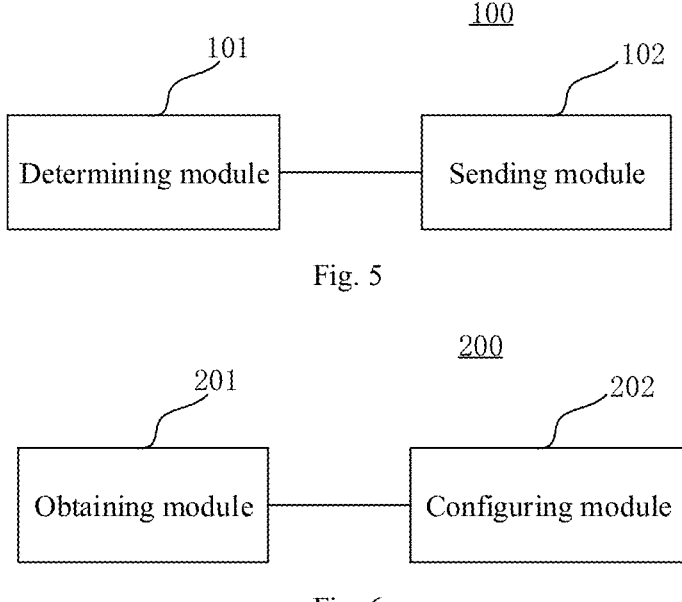
FIG. 5 is a block diagram of a power saving apparatus shown according to an example.
FIG. 6 is a block diagram of a power saving apparatus shown according to an example.
FIG. 7 is a block diagram of a power saving apparatus shown according to an example.

FIG. 5 is a block diagram of a power saving apparatus 100 shown according to an example. Referring to FIG. 5, the apparatus includes a determining module 101 and a sending module 102.

The determining module 101 is configured to determine first assistance information associated with an UE, where the first assistance information indicates a paging parameter for the UE in a non-connected state, and is determined in response to determining that the UE is in a connected state. The sending module 102 is configured to send the first assistance information.

In one implementation, the first assistance information includes at least one of the following:

information for indicating whether the UE supports a power saving signal; information for indicating whether the power saving signal is activated; or information for indicating a mapping relationship between the power saving signal and the number of on-durations.

In one implementation, one or more pieces of the information included in the first assistance information are configured for both the UE in connected state and the UE in non-connected state.

In one implementation, one or more pieces of the information included in the first assistance information are configured for the UE in connected state or the UE in non-connected state.

In one implementation, the first assistance information includes information for indicating whether repeated transmission is activated.

In one implementation, the first assistance information includes first indication information for indicating a repetition number.

In one implementation, the first assistance information includes a start time gap for power saving signal with long discontinuous reception cycle; and/or a start time gap for power saving signal with short discontinuous reception cycle.

In one implementation, sending the first assistance information includes:

the first assistance information is sent to a base station for the base station to send the first assistance information to a core network through an UE release message; or the first assistance information is sent to the base station for the base station to send the first assistance information to the core network through an UE capability information notification message.

Based on the same inventive concept, the disclosure further provides a power saving apparatus.

FIG. 6 is a block diagram of a power saving apparatus 200 shown according to an example. Referring to FIG. 6, the apparatus includes an obtaining module 201 and a configuring module 202.

The obtaining module 201 is configured to obtain first assistance information, where the first assistance information indicates a paging parameter for an UE in a non-connected state, and is determined in response to determining that the UE is in a connected state. The configuring module 202 is configured to determine the paging parameter for the UE in the non-connected state based on the first assistance information.

In one implementation, the first assistance information includes at least one of the following:

information for indicating whether the UE supports a power saving signal; information for indicating whether the power saving signal is activated; or information for indicating a mapping relationship between the power saving signal and the number of on-durations.

In one implementation, one or more pieces of the information included in the first assistance information are configured for both the UE in connected state and the UE in non-connected state.

In one implementation, one or more pieces of the information included in the first assistance information are configured for the UE in connected state or the UE in non-connected state.

In one implementation, determining the paging parameter for the UE in the non-connected state based on the first assistance information includes:

information included in the first assistance information configured at least for the UE in connected state is determined as the paging parameter for the UE in the non-connected state.

In one implementation, the first assistance information includes information for indicating whether repeated transmission is activated.

In one implementation, the first assistance information includes first indication information for indicating a repetition number.

In one implementation, the first assistance information includes a start time gap for power saving signal with long discontinuous reception cycle; and/or a start time gap for power saving signal with short discontinuous reception cycle.

In one implementation, the configuring module 202 is further configured to: take, in response to that the first assistance information includes one start time gap of the start time gap for power saving with long discontinuous reception cycle power saving signal and the start time gap for power saving signal with short discontinuous reception cycle, the one start time gap as a start time gap for power saving signal with discontinuous reception of the UE in the connected state and a start time gap for power saving signal with discontinuous reception of the UE in the non-connected state.

In one implementation, the configuring module 202 is further configured to: in response to that the first assistance information includes the start time gap for power saving with long discontinuous reception cycle power saving signal and the start time gap for power saving with short discontinuous reception cycle power saving signal at the same time, configure, based on the start time gap for power saving signal with long discontinuous reception cycle, a first paging occasion of a paging time window of extended discontinuous reception, and configure, based on the start time gap for power saving signal with short discontinuous reception cycle, a non-first paging occasion of the paging time window of extended discontinuous reception.

In one implementation, the configuring module 202 is further configured to: configure, based on the start time gap for power saving signal with long discontinuous reception cycle, a paging occasion within and outside the paging time window of extended discontinuous reception.

In one implementation, obtaining the first assistance information includes:

the first assistance information is obtained through an UE release message; or, the first assistance information is obtained through an UE capability information notification message.

In one possible implementation, the method further includes:

the paging message carrying assistance information for the UE in the non-connected state is sent.

Based on the same inventive concept, the disclosure further provides a power saving apparatus.

FIG. 7 is a block diagram of a power saving apparatus 300 shown according to an example. Referring to FIG. 7, the apparatus includes a receiving module 301.

The receiving module 301 is configured to receive a paging message carrying assistance information for an UE in a non-connected state.

In one implementation, the receiving module 301 is further configured to: determine a power saving signal configuration in the non-connected state; and send a power saving signal based on the power saving signal configuration in the non-connected state.

As for the apparatus in the above examples, the specific modes for executing operations by all the modules have been described in the examples related to the method in detail, which is not illustrated in detail here.

Figure 8:
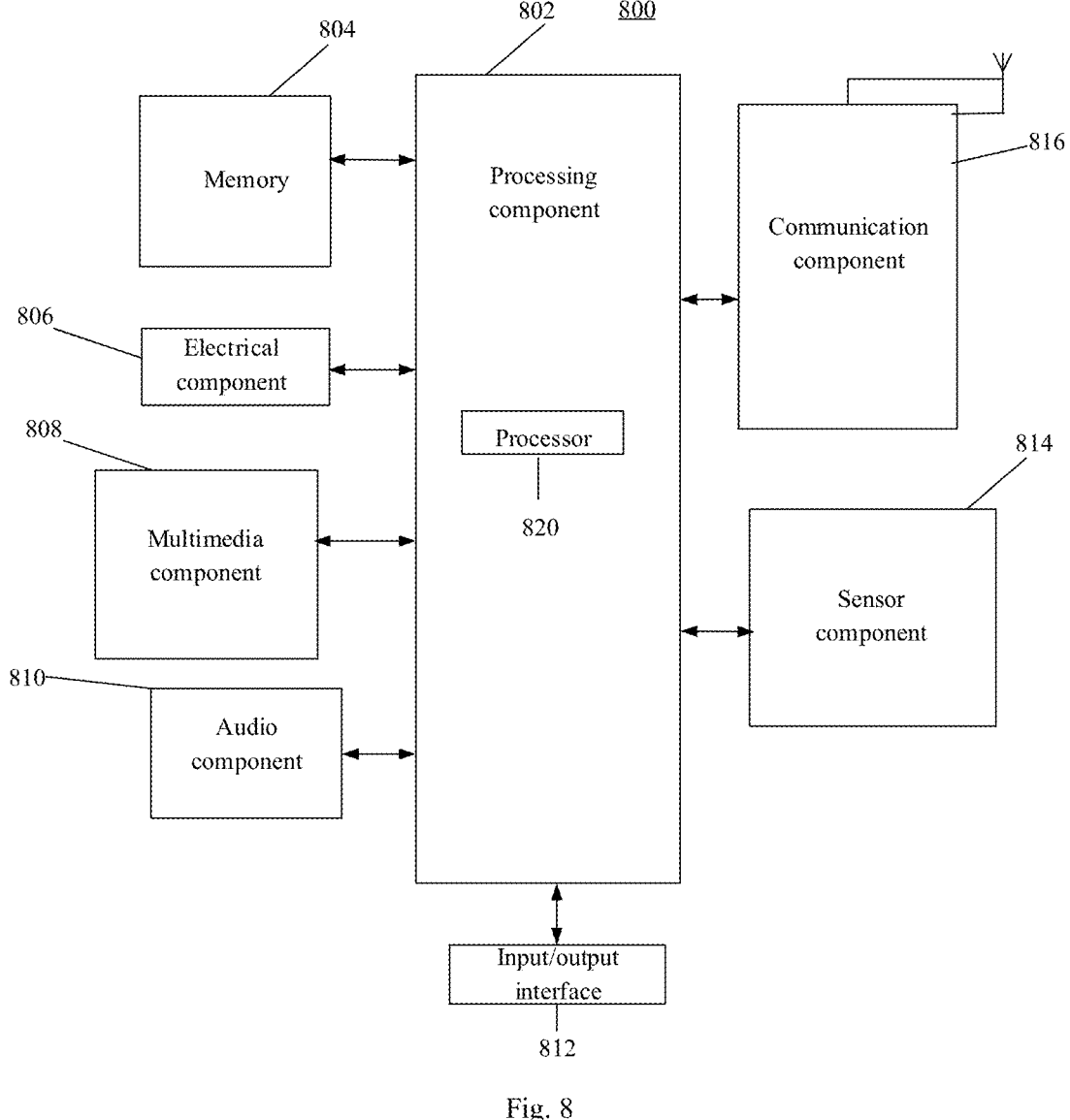
FIG. 8 is a block diagram (a general structure of a mobile terminal) of an apparatus shown according to an example.

FIG. 8 is a block diagram of an apparatus 800 for power saving shown according to an example. For example, the apparatus 800 may be a mobile telephone, a computer, a digital broadcast UE, a message transceiving device, a game console, a tablet device, a medical device, a fitness device, a personal digital assistant, and the like.

Referring to FIG. 8, the apparatus 800 may include one or more of the following components: a processing component 802, a memory 804, an electrical component 806, a multimedia component 808, an audio component 810, an input/output (I/O) interface 812, a sensor component 814, and a communication component 816.

The processing component 802 usually controls overall operation of the apparatus 800, such as operations associated with displaying, telephone calling, data communication, a camera operation and a record operation. The processing component 802 may include one or more processors 820 to execute an instruction, so as to complete all or part of steps of the above method. In addition, the processing component 802 may include one or more modules, so as to facilitate interaction between the processing component 802 and other components. For example, the processing component 802 may include a multimedia module, so as to facilitate interaction between the multimedia component 808 and the processing component 802.

The memory 804 is configured to store various types of data so as to support operations on the apparatus 800. Examples of these data include instructions of any application program or method used to be operated on the apparatus 800, contact data, telephone directory data, messages, pictures, videos, and the like. The memory 804 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 806 provides electric power for various components of the apparatus 800. The electrical component 806 may include a power management system, one or more power sources, and other components associated with generating, managing and distributing electric power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 808 includes a front camera and/or a back camera. When the apparatus 800 is in an operation mode, such as a shooting mode or a video mode, the front camera and/or the back camera may receive external multimedia data. Each front camera and each back camera may be a fixed optical lens system or have a focal length and optical zooming capability.

The audio component 810 is configured to output and/or input an audio signal. For example, the audio component 810 includes a microphone (MIC). In response to determining that the apparatus 800 is in an operation mode, such as a call mode, a recording mode or a speech recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module, and the above peripheral interface module may be a keyboard, a click wheel, buttons, etc. These buttons may include but are not limited to: a home button, a volume button, a start button and a lock button.

The sensor component 814 includes one or more sensors for providing state evaluations of all aspects for the apparatus 800. For example, the sensor component 814 may detect a turn-on/turn-off state of the apparatus 800 and relative positioning of components, for example, the components are a display and a keypad of the apparatus 800. The sensor component 814 may further detect position change of the apparatus 800 or one component of the apparatus 800, whether there is contact between the user and the apparatus 800, azimuth or speed up/speed down of the apparatus 800, and temperature change of the apparatus 800. The sensor component 814 may include a proximity sensor, which is configured to detect existence of a nearby object without any physical contact. The sensor component 814 may further include an optical sensor, such as a CMOS or CCD image sensor, for use in an imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a wireless network based on a communication standard, such as WiFi, 2G or 3G, or their combination. In one example, the communication component 816 receives a broadcast signal or broadcast related information from an external broadcast management system via a broadcast channel. In one example, the communication component 816 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the apparatus 800 may be implemented by one or more application specific integrated circuits (ASIC), digital signal processors (DSP), digital signal processing devices (DSPD), programmable logic devices (PLD), field-programmable gate arrays (FPGA), controllers, microcontrollers, microprocessors or other electronic elements for executing the above method.

In the example, a non-temporary computer readable storage medium including an instruction is further provided, such as a memory 804 including an instruction. The above instruction may be executed by a processor 820 of the apparatus 800 so as to complete the above method. For example, the non-transitory computer readable storage medium may be an ROM, a random access memory (RAM), a CD-ROM, a magnetic tape, a floppy disk, an optical data storage device and the like.

It may be further understood that in the disclosure, "plurality of" refers to two or more than two, and other quantifiers are similar. "And/or" describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship. The singular forms "a", "the" and "this" are intended to include the plural forms as well, unless the context clearly indicates otherwise.

It is further understood that the terms "first", "second" and the like are configured to describe various information, but these information should not be limited to these terms. These terms are merely configured to distinguish the same type of information from one another, and do not imply a particular order or a level of importance. In fact, the expressions "first", "second" and the like may be used completely interchangeably. For example, in a case of not departing from the scope of the disclosure, first information may also be called second information, and similarly, the second information may also be called the first information.

It may be further understood that although in the examples of the disclosure, the operations are described in a specific order in the accompanying drawings, and it should not be construed as requiring that the operations are executed in the specific order shown or a serial order, or that all the operations shown are executed to obtain desired results. In a certain circumstance, multitasking and parallel processing may be advantageous.

Those of skill in the art will easily figure out other implementation solutions of the disclosure after considering the specification and practicing the disclosure here. The disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claims.

It should be understood that the disclosure is not limited to the exact structure that has been described above and shown in the accompanying drawings, and that various modifications and changes may be made without departing from the scope of the disclosure. The scope of the disclosure is limited merely by the appended claims.

The invention claimed is:

1. A power saving method, applied to user equipment (UE), and comprising:
determining a first assistance information associated with the UE, the first assistance information being configured to indicate a set of paging parameters for the UE in a non-connected state, and the first assistance information is determined by the UE when the UE is in a connected state, wherein the set of paging parameters corresponds to a UE group; and
sending, to a network device, the first assistance information; wherein
the first assistance information is used for indicating a mapping relationship between a power saving signal and a number count of on-durations; and
the first assistance information is used for UE in the UE group to monitor paging messages after sending the first assistance information, wherein during the monitoring of paging messages by the UE in the UE group:
the UE in the UE group does not monitor paging occasions (POs) not associated with the first assistance information; and
the UE in the UE group monitors POs associated with the first assistance information.

2. The power saving method according to claim 1, wherein the first assistance information is also used for indicating at least one of the following:
whether a power saving signal is supported; or
whether a power saving signal is activated.

3. The power saving method according to claim 2, wherein one or more pieces of the information comprised in the first assistance information are configured for both the UE in the connected state and the UE in the non-connected state.

4. The power saving method according to claim 2, wherein one or more pieces of the information comprised in the first assistance information are configured for the UE in the connected state or the UE in the non-connected state.

5. The power saving method according to claim 1, wherein the first assistance information comprises information for indicating whether repetition transmission is activated.

6. The power saving method according to claim 5, wherein the first assistance information comprises a first indication information for indicating a repetition number.

7. The power saving method according to claim 1, wherein the first assistance information comprises a start time gap for power saving signal with long discontinuous reception cycle; and/or a start time gap for power saving signal with short discontinuous reception.

8. The power saving method according to claim 1, wherein sending the first assistance information comprises:
sending the first assistance information to a base station for the base station to send the first assistance information to a core network through an UE release message;
or
sending the first assistance information to a base station for the base station to send the first assistance information to the core network through an UE capability information notification message.

9. An electronic device, comprising:
a processor; and
a memory for storing executable instructions of the processor; wherein
the processor is configured to execute the power saving method according to claim 1.

10. A power saving method, applied to a core-network network device, and comprising:
obtaining a first assistance information, the first assistance information being configured to indicate a set of paging parameters for a user equipment (UE) in a non-connected state, and the first assistance information is determined by the UE when the UE is in a connected state, wherein the set of paging parameters corresponds to a UE group; and determining the set of paging parameters for UE in the UE group in the non-connected state based on the first assistance information; wherein the first assistance information is used for indicating a mapping relationship between a power saving signal and a number count of on-durations; and the first assistance information is used for the UE in the UE group to monitor paging messages after sending the first assistance information, wherein during the monitoring of paging messages by the UE in the UE group:

the UE in the UE group does not monitor paging occasions (POs) not associated with the first assistance information; and the UE in the UE group monitors POs associated with the first assistance information.

11. The power saving method according to claim 10, wherein determining the set of paging parameters for the UE in the non-connected state based on the first assistance information comprises:

determining information comprised in the first assistance information configured at least for the UE in the connected state as the set of paging parameters for the UE in the non-connected state.

12. The power saving method according to claim 10, further comprising:

taking a target start time gap as a start time gap for power saving signal with discontinuous reception of the UE in the connected state and a start time gap for power saving signal with discontinuous reception of the UE in the non-connected state, in response to that the first assistance information comprises the target start time gap, the target start time gap is one of the following: a start time gap for power saving signal with long discontinuous reception cycle, and the start time gap for power saving signal with short discontinuous reception cycle.

13. The power saving method according to claim 10, further comprising:

configuring, based on the start time gap for power saving signal with long discontinuous reception cycle, a first paging occasion of a paging time window of extended discontinuous reception, and configuring, based on the start time gap for power saving signal with short discontinuous reception cycle, a non-first paging occasion of the paging time window of extended discontinuous reception, in response to that the first assistance information comprises the start time gap for power saving with long discontinuous reception cycle power saving signal and the start time gap for power saving with short discontinuous reception cycle power saving signal at the same time.

14. The power saving method according to claim 10, further comprising:

configuring, based on the start time gap for power saving signal with long discontinuous reception cycle, a paging occasion within a paging time window and outside the paging time window of extended discontinuous reception.

15. The power saving method according to claim 10, wherein obtaining the first assistance information comprises:

obtaining the first assistance information through an UE release message;

or obtaining the first assistance information through an UE capability information notification message.

16. The power saving method according to claim 10, further comprising:

sending a paging message carrying assistance information for the UE in the non-connected state.

17. An electronic device, comprising:

a processor; and a memory for storing executable instructions of the processor;

wherein the processor is configured to execute the executable instructions to implement the power saving method according to claim 10.

18. A power saving method, applied to a base station, and comprising:

receiving a paging message carrying assistance information for an UE in a non-connected state, the assistance information being configured to indicate a set of paging parameters for the UE in the non-connected state, wherein the set of paging parameters corresponds to a UE group; wherein the assistance information is used for indicating a mapping relationship between a power saving signal and a number count of on-durations; and the assistance information is used for UE in the UE group to monitor paging messages after sending the assistance information, wherein during the monitoring of paging messages by the UE in the UE group:

the UE in the UE group does not monitor paging occasions (POs) not associated with the assistance information; and the UE in the UE group monitors POs associated with the assistance information.

19. The power saving method according to claim 18, further comprising:

determining a power saving signal configuration in the non-connected state; and sending a power saving signal based on the power saving signal configuration in the non-connected state.

20. An electronic device, comprising:

a processor; and a memory for storing executable instructions of the processor;

wherein the processor is configured to execute the executable instructions to implement the power saving method according to claim 18.

* * * * *